US010810901B2

(12) United States Patent
Yan et al.

(10) Patent No.: US 10,810,901 B2
(45) Date of Patent: Oct. 20, 2020

(54) PIANO SYSTEM AND METHOD THEREOF

(71) Applicant: SUNLAND INFORMATION TECHNOLOGY CO., LTD., Shanghai (CN)

(72) Inventors: Bin Yan, Shanghai (CN); Min Zhou, Shanghai (CN); Xiaolu Liu, Shanghai (CN)

(73) Assignee: SUNLAND INFORMATION TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/384,176

(22) Filed: Apr. 15, 2019

(65) Prior Publication Data

US 2019/0244539 A1     Aug. 8, 2019

Related U.S. Application Data

(63) Continuation of application No. PCT/CN2017/072657, filed on Jan. 25, 2017.

(51) Int. Cl.
*G10H 1/00* (2006.01)
*G09B 15/02* (2006.01)
(Continued)

(52) U.S. Cl.
CPC ............. *G09B 15/02* (2013.01); *G09B 5/06* (2013.01); *G10C 3/00* (2013.01); *G10H 1/00* (2013.01);
(Continued)

(58) Field of Classification Search
CPC ............. H04N 1/0044; H04N 1/00456; H04N 5/44543; G10H 1/368; G10H 2220/101;
(Continued)

(56) References Cited

U.S. PATENT DOCUMENTS 5,728,960 A *  3/1998  Sitrick .................... G10G 1/00
                                                    84/477 R
6,388,181 B2    5/2002  Moe
(Continued)

FOREIGN PATENT DOCUMENTS

CN         101916560 A      12/2010
CN         102664000 A       9/2012
(Continued)

OTHER PUBLICATIONS

International Search Report in PCT/CN2017/072657 dated Oct. 31, 2017, 5 pages.
(Continued)

*Primary Examiner* — Marlon T Fletcher
(74) *Attorney, Agent, or Firm* — Metis IP LLC

(57) ABSTRACT

The present disclosure relates to a method and system for providing tutorial functions. The method may include obtaining a piece of music selected by a user; determining a display mode that configures one or more display categories and a layout of the one or more display categories on a user interface; obtaining one or more content items corresponding to the one or more display categories, respectively, the one or more content items being associated with the piece of music; and generating an instruction to display the one or more content items on the user interface according to the layout.

20 Claims, 16 Drawing Sheets

(51) Int. Cl.
*G10H 1/36* (2006.01)
*G09B 5/06* (2006.01)
*G10C 3/00* (2019.01)
*G10G 1/00* (2006.01)

(52) U.S. Cl.
CPC ........... G10H 1/0008 (2013.01); G10H 1/368 (2013.01); *G10G 1/00* (2013.01); *G10H 2210/061* (2013.01); *G10H 2220/015* (2013.01); *G10H 2220/096* (2013.01)

(58) Field of Classification Search
CPC ....... G10H 2240/131; G10H 2240/145; G10H 2240/135; G10H 2220/091; G10H 2240/125; G10H 2240/141; G10H 2240/155
See application file for complete search history.

(56) References Cited

U.S. PATENT DOCUMENTS

| | | | | |
|---|---|---|---|---|
| 6,740,802 | B1* | 5/2004 | Browne, Jr. | G10H 1/0025 84/609 |
| 2001/0023633 | A1* | 9/2001 | Matsumoto | G09B 15/023 84/478 |
| 2004/0055441 | A1* | 3/2004 | Katsuta | G09B 15/00 84/470 R |
| 2008/0066611 | A1* | 3/2008 | Makino | G10H 1/0008 84/609 |
| 2008/0196575 | A1* | 8/2008 | Good | G09B 15/04 84/470 R |
| 2008/0302233 | A1* | 12/2008 | Ding | G09B 15/002 84/609 |
| 2010/0300269 | A1* | 12/2010 | Applewhite | G10H 1/0058 84/610 |
| 2010/0304863 | A1* | 12/2010 | Applewhite | G10H 1/368 463/36 |
| 2011/0132172 | A1* | 6/2011 | Gueneux | G10G 1/00 84/454 |
| 2011/0203442 | A1* | 8/2011 | Raveendran | G09B 15/023 84/483.1 |
| 2014/0000440 | A1* | 1/2014 | Georges | G10H 7/00 84/609 |

FOREIGN PATENT DOCUMENTS

| | | |
|---|---|---|
| CN | 203422918 U | 2/2014 |
| CN | 103903602 A | 7/2014 |
| CN | 105608953 A | 5/2016 |
| CN | 205541909 U | 8/2016 |

OTHER PUBLICATIONS

Written Opinion in PCT/CN2017/072657 dated Oct. 31, 2017, 4 pages.

* cited by examiner

600

Obtaining a plurality of historical records associated with the user including one or more historical pieces of music selected by the user, one or more historical content items associated with the one or more historical pieces of music, and one or more historical display modes associated with playing the one or more historical pieces of music  ~/ 610

Determining a display mode based on the plurality of historical records associated with the user and the piece of music selected by the user.  ~/ 620

For each of the two or more phases, configuring one or more phasic display categories and a phasic layout of the one or more phasic display categories on the user interface for the phasic display mode — 810

Obtaining the one or more phasic content items corresponding to the one or more phasic display categories, respectively, the one or more phasic content items being associated with a corresponding phasic piece of music — 820

FIG. 8

PIANO SYSTEM AND METHOD THEREOF

CROSS-REFERENCE TO RELATED APPLICATIONS

This application is a Continuation of International Application No. PCT/CN2017/072657, filed on Jan. 25, 2017, the contents of which are incorporated herein by reference.

TECHNICAL FIELD

The present disclosure generally relates to a piano system, and more particularly, to a piano system with tutorial functions.

BACKGROUND

As one of the world's most popular musical instruments, the piano is widely played and studied today. Piano playing may offer educational and wellness benefits to a pianist. There are many people learning or practicing piano-playing. It's desirable to provide a piano with tutorial functions.

SUMMARY

According to an aspect of the present disclosure, a piano system may include a display; a keyboard hosting a plurality of keys operable to a user; at least one processor and at least one computer-readable storage medium including a set of instructions for presenting contents to the user. When executing the instructions, the at least one processor is directed to: obtain a piece of music selected by the user; obtain a display mode that configures one or more display categories and a layout of the one or more display categories on a user interface; obtain one or more content items corresponding to the one or more display categories, respectively, the one or more content items being associated with the piece of music; and generate an instruction to display the one or more content items on the user interface according to the layout.

According to an aspect of the present disclosure, a method may include obtaining a piece of music selected by a user; determining a display mode that configures one or more display categories and a layout of the one or more display categories on a user interface; obtaining one or more content items corresponding to the one or more display categories, respectively, the one or more content items being associated with the piece of music; and generating an instruction to display the one or more content items on the user interface according to the layout.

According to an aspect of the present disclosure, a non-transitory computer readable medium may include instructions configured to cause a computing system to: obtain a piece of music selected by a user; determine a display mode that configures one or more display categories and a layout of the one or more display categories on a user interface; obtain one or more content items corresponding to the one or more display categories, respectively, the one or more content items being associated with the piece of music; and generate an instruction to display the one or more content items on the user interface according to the layout.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 6 is a flowchart of an exemplary process for determining a display mode for a piano system according to some embodiments of the present disclosure.

FIG. 8 is a flowchart of an exemplary process for determining one or more phasic content items for a piece of music according to some embodiments of the present disclosure.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirits and scope of the present disclosure. Thus, the present disclosure is not limited to the embodiments shown, but to be accorded the widest scope consistent with the claims.

It will be understood that the term "system," "unit," "module," and/or "block" used herein are one method to distinguish different components, elements, parts, section or assembly of different level in ascending order. However, the terms may be displaced by other expression if they may achieve the same purpose.

It will be understood that when a unit, module or block is referred to as being "on," "connected to" or "coupled to" another unit, module, or block, it may be directly on, connected or coupled to the other unit, module, or block, or intervening unit, module, or block may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

The terms "music" and "sound" may be interchangeable.

Figure 1:
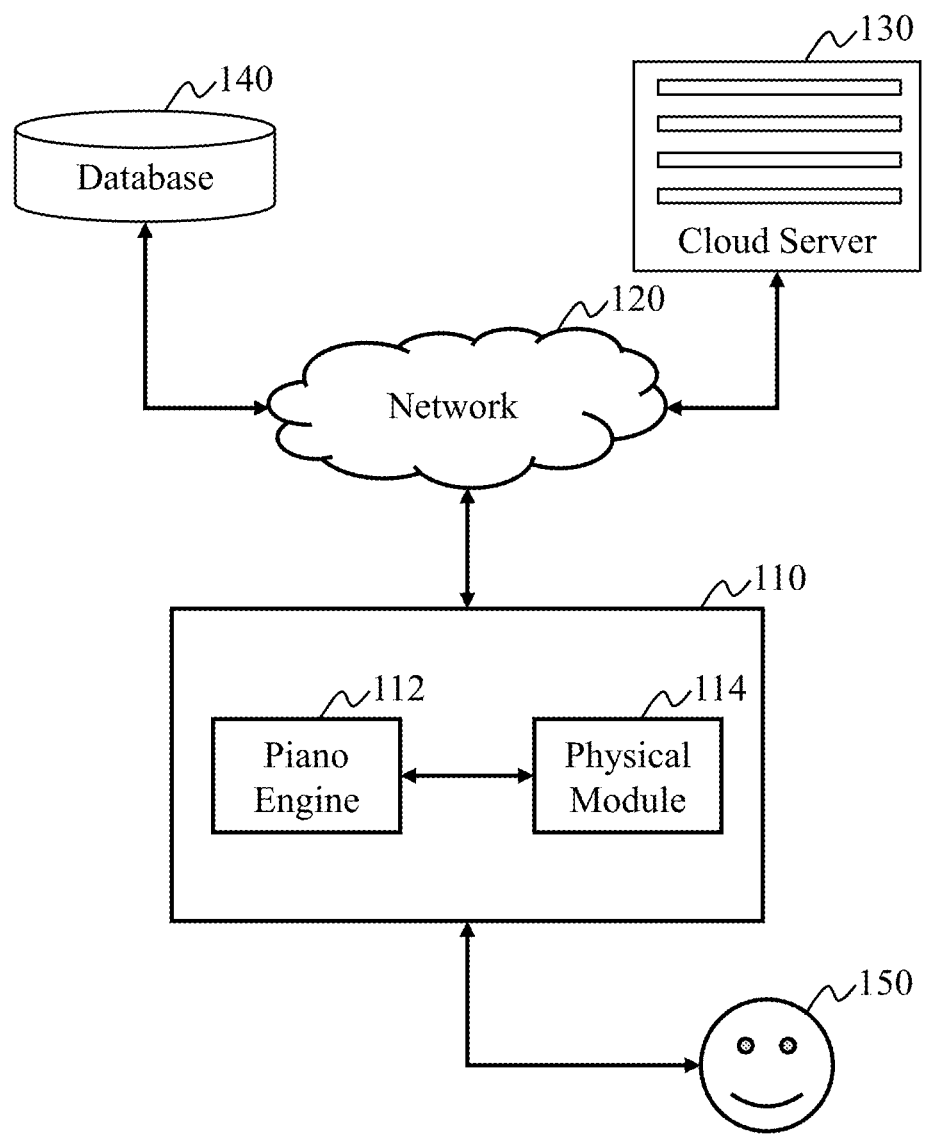
FIG. 1 is a block diagram illustrating an application scenario of a piano system according to some embodiments of the present disclosure.

FIG. 1 is a block diagram illustrating an application scenario of a piano system 100 according to some embodiments of the present disclosure. It should be noted that the piano system 100 described below is merely provided for illustrative purposes, and not intended to limit the scope of the present disclosure.

As illustrated in FIG. 1, the piano system 100 may include a digital instrument 110, a network 120, one or more cloud servers 130, and one or more databases 140. A user 150 may manipulate the digital instrument 110 and practice.

The digital instrument 110 may be an instrument with a keyboard (e.g., a piano, an organ, an accordion, a synthesizer, an electronic keyboard, etc.), a string musical instrument (e.g., a guitar, a zither, a koto, etc.), or the like, or any combination thereof. For example, the digital instrument 110 may include a piano with keys and/or pedals. As referred to herein, a piano may be an acoustic piano, an electric piano, an electronic piano, a digital piano, and/or any other musical instrument with a keyboard. In some embodiments, the piano may be a grand piano, an upright piano, a square piano, etc.

The digital instrument 110 may include a piano engine 112 and a physical module 114. The piano engine 112 may receive inputs from the user 150 and generate information, instruction(s), notification(s), or interface(s). The piano engine 112 may be configured to control or monitor operations of the physical module 114. The physical module 114 may produce an acoustic sound in response to certain actions initiated by the user 150 (e.g., pressing key(s), stepping pedal(s), etc.). In some embodiments, the piano engine 112 and the physical module 114 may be located within a single housing or different housings.

The piano engine 112 may include a processing unit. Merely by way of example, the piano engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The physical module 114 may be an acoustic piano, or any other acoustic instrument. The physical module 114 may include one or more mechanisms to allow the user 150 to play music. The digital instrument 110 may generate sounds when the user 150 plays the physical module 114. Alternatively or additionally, the digital instrument 110 may automatically generate sounds and/or audio content for playback.

In some embodiments, the piano system 100 may implement one or more tutorial functions. For example, the piano system 100 may instruct the user 150 on how to play the piano during the course of performance. The piano system 100 may present tutorial functions, content items, and/or user interface. In some embodiments, the piano system 100 may record performances of the user 150.

The network 120 may facilitate exchange of information and/or data. In some embodiments, one or more components in the piano system 100 (e.g., the digital instrument 110, the cloud server 130, and/or the database 140) may send information and/or data to other component(s) in the piano system 100 via the network 120. For example, the digital instrument 110 may obtain/acquire information associated with the user 150 from the database 140 via the network 120. In some embodiments, the network 120 may be any type of wired or wireless network, or combination thereof. Merely by way of example, the network 130 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points through which one or more components of the piano system 100 may be connected to the network 120 to exchange data and/or information.

In some embodiments, the cloud server 130 may be a single server, or a server group. The server group may be centralized, or distributed (e.g., cloud server 130 may be a distributed system). In some embodiments, the cloud server 130 may be local or remote. For example, the cloud server 130 may access information and/or data stored in the digital instrument 110 and/or the database 140 via the network 120. As another example, the cloud server 130 may be directly connected to the digital instrument 110, and/or the database 140 to access stored information and/or data. In some embodiments, the cloud server 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the cloud server 130 may be implemented on a computing device 200 having one or more components illustrated in FIG. 2 in the present disclosure.

The database 140 may store data and/or instructions. In some embodiments, the database 140 may store data obtained from the digital instrument 110 and/or the cloud server 120. In some embodiments, the database 140 may store data and/or instructions that the digital instrument 110 may execute or use to perform exemplary methods described in the present disclosure. In some embodiments, database 140 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 140 may store information associated with the piano system 100. The information may include the user profile, computer program instructions, presets, system parameters, information related to a piece of music, information related to interactions between the user 150 and components (e.g., keys or pedals) of the piano system 100, etc. In some embodiments, the user profile may relate to the proficiency, preferences, characteristics, music genre, favorite music, and/or favorite composers of a user. In some embodiments, the computer program instructions may relate to working modes, volume control, display modes, or the like, or a combination thereof. In some embodiments, the presets may relate to the working modes, functions, interfaces, menus of the piano system 100. The presets may be set by the piano manufacturer or the user. In some embodiments, the system parameters may relate to the characteristics, specifications, features of the physical module 114 and/or piano engine 112. In some embodiments, information related to a piece of music may include information related to phases within the piece of music, information related to transitions within the piece of music, music genre, composer, structure, musical notation, other background information, experience or history of performance of the piece of music, etc. In some embodiments, the information related to the interactions may include pressure data related to a pressing of a key, a duration of the pressing of the key, pressure data related to an operation applied to a pedal, a duration of the operation applied to the pedal, or the like, or a combination thereof.

In some embodiments, the database 140 may store information received from the digital instrument 110, the network 120, the cloud server 130, or the user 150. Furthermore, the database 140 may communicate with other modules or components in the piano system 100.

In some embodiments, the database 140 may communicate with one or more components in the piano system 100 via the network 120 (e.g., the digital instrument 110 and/or the cloud server 130). One or more components in the piano system 100 may access the data or instructions stored in the database 140 via the network 120. In some embodiments, the database 140 may be directly connected to or communicate with one or more components in the piano system 100 (e.g., the digital instrument 110 and/or the cloud server 130). In some embodiments, the database 140 may be part of the digital instrument 110.

In some embodiments, one or more components in the piano system 100 (e.g., the digital instrument 110 and/or the cloud server 130) may have a permission to access the database 140. In some embodiments, one or more components in the piano system 100 may read and/or modify information stored in the database 140 that is related to the user 150, music, and/or content items associated with music. For example, the digital instrument 110 may read and/or modify one or more users' identities, accounts, or preferences.

In some embodiments, the user 150 may be a human being, a robot, a computing device, or any other types of user that is capable of operating the piano system 100. The user 150 may press or release one or more keys and/or pedals of digital instrument 110 using one or more parts of the user's body when playing. For example, the user 150 may press or release one or more keys in the digital instrument 110 to play music by fingers. The user 150 may press or release one or more pedals of the digital instrument 110 to play music by one or both feet.

In some embodiments, the piano system 100 may have one or more working modes, such as a normal mode, a tutorial mode, a presenting mode, or the like, or a combination thereof. In some embodiments, in the normal mode, the piano system 100 may allow the user 150 to play the digital instrument 110 and produce piano sounds without providing or displaying content items. In the tutorial mode, the piano system 100 may provide or display one or more tutorials on a user interface and allow the user 150 to play at the same time. The tutorials may instruct the user 150 to practice the piano system 100, for example, the keys. More particularly, in the normal mode and/or the tutorial mode, the piano system 100 may monitor the manipulation of the digital instrument 110 by the user 150. In some embodiments, in the presenting mode, the piano system 100 may present only the content items (e.g., characters, images, videos, animations, etc.) to the user 150. The piano system 100 may not allow the user 150 to play in the presenting mode. Additionally or alternatively, in the presenting mode, the piano system 100 may not monitor actions from the user 150.

The piano system 100 may implement at least two working modes and switch between the working modes based on user's selections. For example, the piano system 100 may prompt user 150 to select one or more of the working modes (e.g., by providing a switch, presenting one or more user interfaces, etc.). In response to receiving a user selection of one or more working modes (e.g., via a switch), the piano system 100 may operate at the selected working mode(s).

In some embodiments, the cloud server 130 and/or the database 140 may store a plurality of content items. The content items may be associated with one or more pieces of music. The content items may include at least one of characters, images, videos, or animations. In some embodiments, a live performance associated with the one or more pieces of music may be recorded and stored in the database 140. The live performance may be a live concert, a live musical theatre, a live music opera, etc.

The images, videos, or animations in the content items may have one or more definition formats. In some embodiments, the definition format may be a high definition (HD) format. Exemplary HD format may include HD format (e.g., 1920×1080 p), ultra high-definition (UHD) format with a 3,840×2,160 resolution (referred to as 4K UHD) or a 7,680× 4,320 (referred to as 8K UHD), or a 3,840×1,080 resolution. In some embodiments, the content items may have other definitions.

Figure 2:
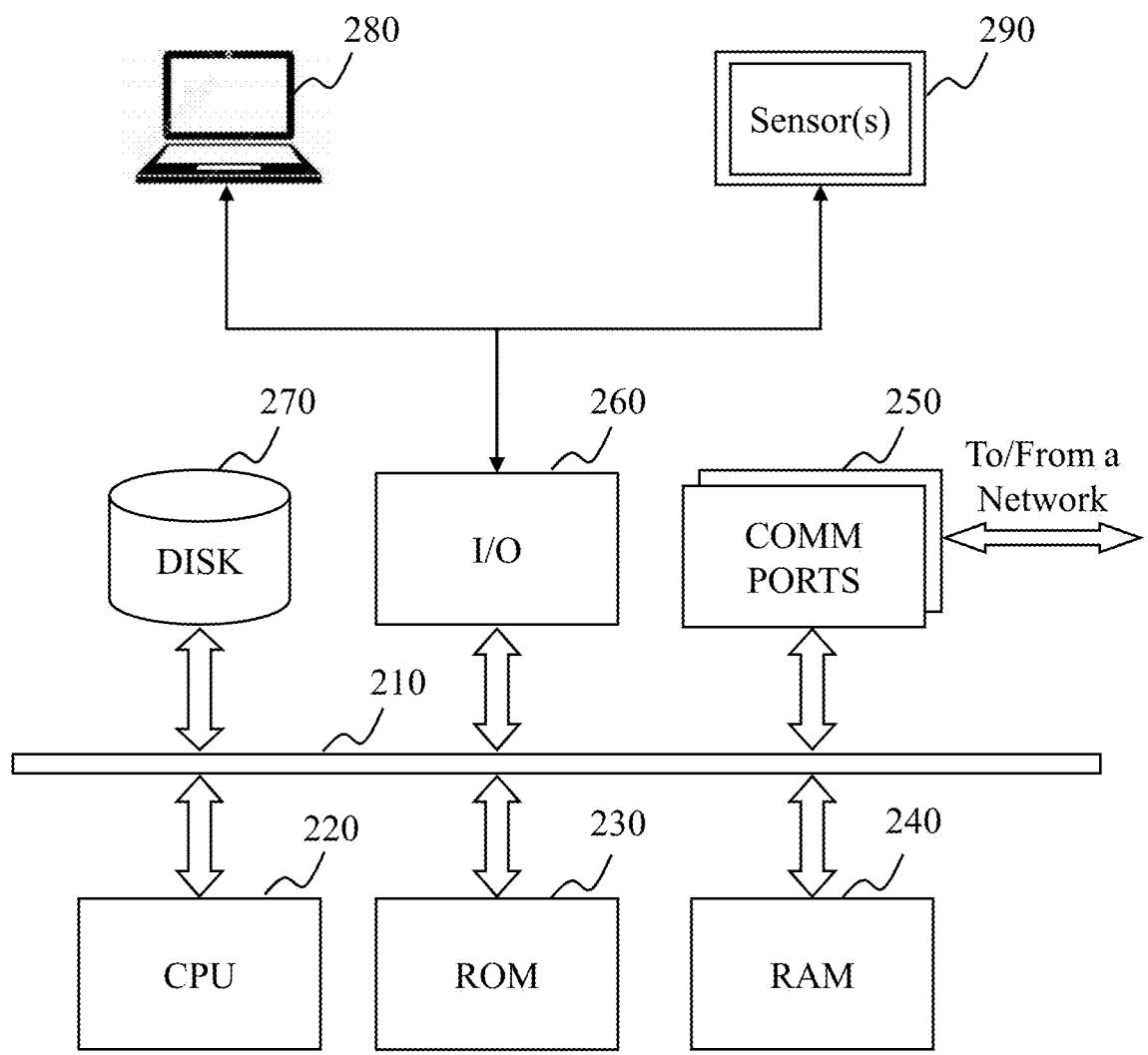
FIG. 2 is a schematic diagram illustrating exemplary hardware and software components of a computing device according to some embodiments of the present disclosure.

FIG. 2 is a schematic diagram illustrating exemplary hardware and software components of a computing device 200 according to some embodiments of the present disclosure.

The computing device 200 may be a general purpose computer or a special purpose computer. The digital instrument 110 or the cloud server 130 in FIG. 1 may be implemented on the computing device 200. The computing device 200 may be used to implement any component of the piano system 100 as described herein. For example, the piano engine 112 may be implemented on the computing device 200, via its hardware, software program, firmware, or a combination thereof. Although only one such computer is shown, for convenience, the computer functions related to the piano system 100 as described herein may be implemented in a distributed fashion on a number of similar platforms, to distribute the processing load.

The computing device 200 may include an internal communication bus 210 connecting other components of the computing device 200. The computing device 200 may also include a central processing unit (CPU) 220, in the form of one or more processors, for executing program instructions. The exemplary computer platform may include program storage and data storage of different forms, for example, a read only memory (ROM) 230, a random access memory (RAM) 240, or a disk 270, for various data files to be processed and/or transmitted by the computer. The exemplary computer platform may also include program instructions stored in the ROM 230, the RAM 240, the disk 270, and/or other type of non-transitory storage medium to be executed by the CPU 220. The methods and/or processes of the present disclosure may be implemented as the program instructions. The computing device 200 may have communication components, for example, COM ports 250 connected to and from a network connected thereto to facilitate data communications. The computing device 200 also includes an I/O component 260, supporting input/output between the computer and other components therein such as user interface elements 280 and sensors 290. The computing device 200 may also receive programming and data via network communications.

Merely for illustration, only one CPU and/or processor 220 is described in the computing device 200. However, it should be noted that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

The I/O component 260 may collect, receive, present, or display information. The I/O component may include an input device and/or an output device. For example, the input device may include a microphone, a camera, a keyboard (e.g., a computer keyboard), a touch-sensitive device, or the like. The output device may include, a display, a stereo, a loudspeaker, a headset, an earphone, or the like.

In some embodiments, the I/O component 260 may provide one or more interfaces to facilitate communications between the digital instrument 110, a cloud server 130, a database 140, a user 150, or an external device. The I/O component 260 may provide a sound signal, information related to a condition of the digital instrument 110, a current status of the digital instrument 110, and/or a menu for the user 150. Thus, the user 150 may select certain working modes/functions/features of the digital instrument 110. The I/O component 260 may receive the selection of the working modes/functions/features of the digital instrument 110 from the user 150. In some embodiments, the I/O component 260 may facilitate the digital instrument 110 to receive an input provided by the user 150. The input may be an image, a sound/voice, a gesture, a touch, a biometric input, etc.

In some embodiments, the user interface elements 280 may generate a user interface to display content items (e.g., characters, images, videos, animations, etc.) to the user 150. The display may be a LED display, an OLED display, a LCD, etc. The display may have a display resolution format. In some embodiments, the display resolution format may be a high definition (HD) format. Exemplary HD format may include HD format (e.g., 1920×1080 p), ultra-high-definition (UHD) format with a 3,840×2,160 resolution (referred to as 4K UHD) or a 7,680×4,320 (referred to as 8K UHD), or a 3,840×1,080 resolution. In some embodiments, the display may have other resolutions. The content items may have a resolution format. In some embodiments, the content items may have an identical resolution format with the display. In some embodiments, the user interface may have an identical width as the keyboard of the digital instrument 110.

In some embodiments, the sensor(s) 290 may detect, receive, process, record, etc. information related to interactions between the user 150 and the keys of the digital instrument 110. In some embodiments, the sensor(s) 290 may detect, receive, process, record, etc. information related to interactions between components of the piano system 100. The information may include, for example, image data, audio data, pressure data, motion data, etc. In some embodiments, the sensor(s) 290 may be and/or include an image sensor, an audio sensor, a pressure sensor, a speed sensor, an accelerometer, a mechanical sensor, or the like, or any combination thereof. In some embodiments, the sensor(s) 290 may be coupled with a housing, one or more keys, pedals, strings, and/or any other component of the digital instrument 110. Information recorded by the sensor(s) 290 may be transmitted to the CPU 220, the ROM 230, the RAM 240, or the disk 270, etc. In some embodiments, the CPU 220 may determine a feedback to the user 150 based on the recorded information from the sensor(s) 290. The feedback may allow the user 150 to correct or improve his/her piano-playing.

In some embodiments, the image data may include any images and/or videos related to performance of the digital instrument 110 by the user 150. The image data may be collected in a real-time manner. In some embodiments, the image data may be displayed on the user interface elements 280 to allow the user 150 to adjust or improve his/her piano-playing.

In some embodiments, the audio data may include any sounds, voices and/or vibration related to performance of the digital instrument 110 by the user 150. The audio data may be collected in a real-time manner.

In some embodiments, the pressure data may include any data and/or information related to a force applied to a first component of the piano system 100 by one or more other components of the piano system 100 (e.g., a second component of the piano system 100) or a user 150. For example, the pressure data may include data and/or information about a pressure applied to one or more strings by a hammer, a pressure applied to an elastic structure by a hammer, a pressure applied to a key pressed by a user, etc. The pressure data may include, for example, an area over which the pressure is exerted, an intensity of the pressure, duration of the pressure, a direction of the pressure, an amount of a force related to the pressure, etc.

The motion data may include any information and/or data about movement of one or more keys, hammers, strings, and/or any other component of the piano system 100. The motion data may include a position, a speed, a velocity, an acceleration, etc. For example, the motion data may include a speed and/or velocity of a hammer related to the interaction (e.g., a speed at which the hammer strikes a string), a velocity of one or more points of a string during an interaction between the string and a hammer, etc. In some embodiments, the sensor(s) 310 may record an amount of pressure applied to a string when a hammer strikes the string.

Figure 3:
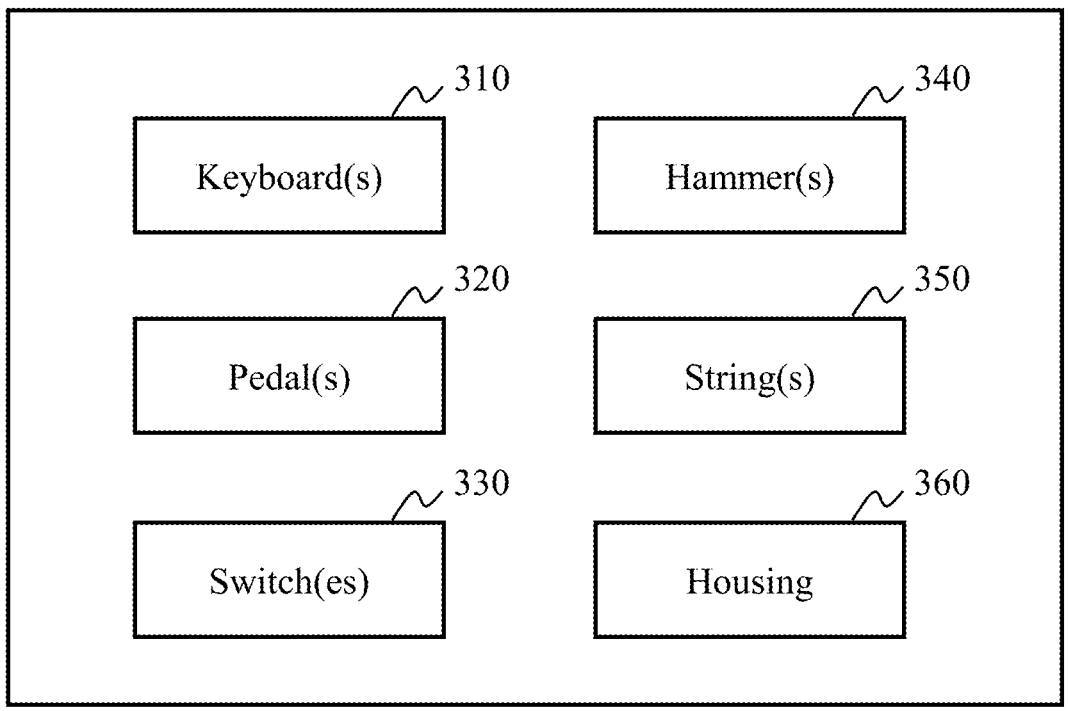
FIG. 3 is a block diagram illustrating an exemplary physical module according to some embodiments of the present disclosure.

FIG. 3 is a block diagram illustrating an exemplary physical module 114 according to some embodiments of the present disclosure. The physical module 114 may include any component for generating sounds in the piano system 100. For example, the physical module 114 may include one or more keyboards 310, one or more pedals 320, one or more switches 330, one or more hammers 340, one or more strings 350, a housing 360, or the like, or any combination thereof.

The keyboard(s) 310 may include one or more keys (e.g., white keys, black keys, etc.). In some embodiments, each of the keys may correspond to a musical note.

Each of pedal(s) 320 may include a foot-operated lever that may modify the piano's sound. For example, the pedal(s) 320 may include a soft pedal (e.g., a una corda pedal) that may be operated to cause the piano to produce a softer and more ethereal tone. As another example, the pedal(s) 320 may include a sostenuto pedal that may be operated to sustain selected notes. As still another example, the pedal(s) 320 may include a sustaining pedal (e.g., a damper pedal) that may be operated to make the notes continue to sound until the pedal is released. In some embodiments, each of pedal(s) 320 may include an input device that may receive user input entered by a user's foot, feet, etc. The pedal(s) 320 may receive the user input and cause one or more functions of the piano system 100 to be implemented based on the user input. For example, the user 150 may select a working mode of the piano system 100 using one or more pedals 320. As another example, a presenting mode may be implemented in response to one or more operations of the pedal(s) 320 by the user 150.

The pedal(s) 320 may be positioned in any manner for user operation. For example, one or more of the pedal(s) 320 may be positioned below the keyboard 310 and may be accessed and operated by a user's foot and/or both feet. In some embodiments, the position of the pedal(s) 320 may be adjustable so that the sound generated by the strings 350 may be tuned. In some embodiments, the physical module 114 may include more than one pedal 320.

The switch(es) 330 may provide the user 150 with one or more working modes of the piano system 100 and may include mechanisms for receiving a user selection of one or more of the working modes. For example, the switch(es) 330 may include one or more buttons, knobs, pedals, and/or any other device that may be used to receive a user selection of one or more working modes. In some embodiments, the working modes may include, for example, a normal mode, a tutorial mode, and a presenting mode. In some embodiments, operations on the switch(es) 330 may switch the digital instrument 110 from one working mode to another. In some embodiments, the switch(es) 330 may be operationally coupled to one or more components of the physical module 114 and/or the piano system 100 for implementations of different working modes. For example, the switch(es) 330 may be electrically and/or mechanically coupled to one or more of the components. The switch(es) 330 may be operationally coupled to one or more of the components via a direct connection, one or more intermediate devices, and/or in any other manner. For example, the switch(es) 330 may be coupled to a locking component that may enable or disable a user's manipulation of the digital instrument 110.

In some embodiments, the one or more of pedal(s) 320 and the switch(es) 330 may be integrated into a single device. For example, a single operation of a pedal by the user 150 may also cause the piano system 100 to switch between different working modes (e.g., a normal mode, a tutorial mode, a presenting mode, etc.).

Each hammer 340 may be associated with one or more keys of the piano. In some embodiments, the hammer(s) 340 may be mechanically coupled to one or more components of the physical module 114 and/or the piano system 100. For example, the hammer(s) 340 may be operationally coupled to the keyboard(s) 310, the pedal(s) 320, the switch(es) 330, and/or any other component of physical module 114 and/or piano system 100. A hammer 340 may be positioned at a resting position when its corresponding key is not pressed. When the user 150 presses the key, the hammer 340 may move towards a string 350 from the resting position. The hammer 340 may strike the string 350 at a speed (e.g., several meters per second). The string 350 may vibrate to generate a sound. In some embodiments, one or more portions of the hammer 340 and/or the string 350 may contact with the I/O component 260 in the computing device 200.

The housing 360 may form an enclosure or a space within which the hammer(s) 340 and the string(s) 350 of the physical module 114 are located. In some embodiments, the housing 360 may also contain the piano engine 112. The pedal(s) 320 may be mounted to the housing 360 from the outside. The pedal(s) 320 may be connected to other components inside the housing 360 by a mechanical manner. In some embodiments, the switch(es) 330 may be located within the housing 360.

In some embodiments, one or more components in the piano engine 112 and one or more components in the physical module 114 may be integrated into a single component. As another example, I/O components 260 may be configured on or near keyboard 310, pedal(s) 320, hammer(s) 340, or string(s) 350 to collect information.

Figure 4:
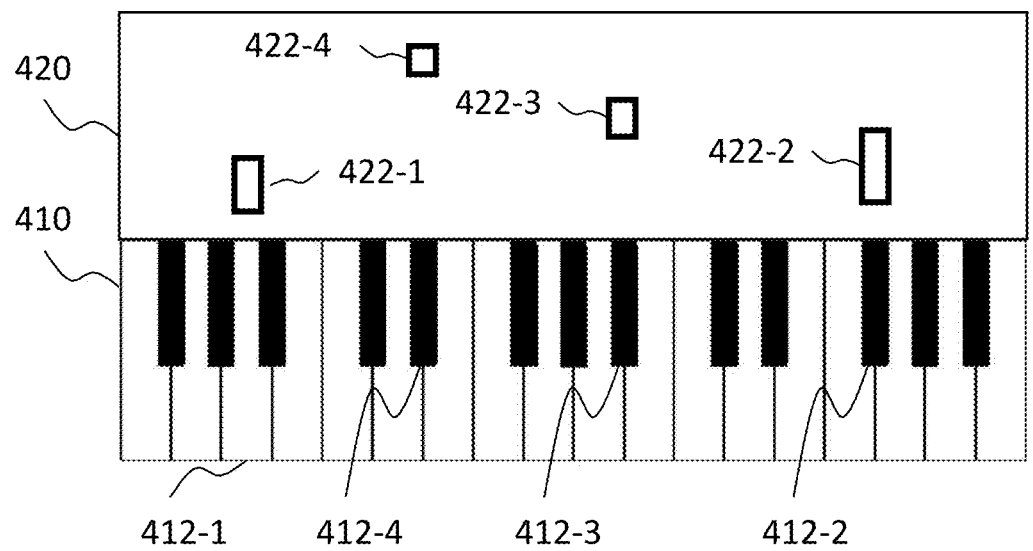
FIG. 4 is a diagram illustrating an exemplary keyboard and an exemplary display according to some embodiments of the present disclosure.

FIG. 4 is a diagram illustrating an exemplary keyboard 410 and an exemplary display 420 according to some embodiments of the present disclosure. As shown in FIG. 4, a display 420 may be provided adjacent to a keyboard 410. The display 420 may have the same width with the keyboard 410. The keyboard 410 may include multiple keys, for example, the keys 412-1 through 412-4. The keys may include white keys and black keys.

The display 420 may display at least one of characters, images, videos, or animations. The characters may include one or more musical notations. The images may include images related to the music, the composer, the performer, a scenario related to performance of the music, or any other relevant figures or objects. The videos may include a live video of a concert, a video showing manipulation of a piano by a pianist, a video showing a performance of a music band, etc. The animations may include a tutorial animation, an introductory animation, or any other animations. The tutorial animation may instruct the user 150 to operate the digital instrument 110.

In some embodiments, the display 420 may display an animation including multiple objects 422-1 through 422-4 as tutorials to a piano learner. The objects 422-1 through 422-4 may be in a vertical motion. The objects 422-1 through 422-4 may fall from the top of the display 420 to the bottom. An object may correspond to a certain key in the keyboard 410. The object and the key may be vertically aligned. For example, the object 422-1 may correspond to the white key 412-1. The object 422-2 may correspond to the black key 412-2. The object 422-3 may correspond to the black key 412-3. The object 422-4 may correspond to the black key 412-4. The height of the object may indicate duration of a pressure of the user 150 exerted on the corresponding key associated with the object. The more the height of the object is, the longer the duration of the pressure is. In some embodiments, the objects may have one or more colors. A color may represent an intensity of the pressing on a key.

In some embodiments, the display 420 may present objects 422-1 through 422-4 simultaneously with the user 150 pressing the key 412-1 through 412-4. For example, when the keys 412-1 through 412-4 need to be pressed sequentially, the display 420 may display the objects 422-1 through 422-4 sequentially to notify the user 150 to press the corresponding key. Specifically, when the bottom of an object, for example, 422-1 reaches the bottom border of the display 420, the user 150 is notified to start pressing the white key 412-1. The user 150 should keep pressing down the white key 412-1 while the object 422-1 moves downwards. When the top of the object 422-1 reaches the bottom border of the display 420, the user 150 is notified to release the white key 412-1. In the meantime, one or more other objects move towards the bottom border of the display 420 sequentially to notify the user 150 to press the corresponding keys.

It should be understood that the objects shown in FIG. 4 are for illustrative purpose. The present disclosure is not intended to be limiting. For example, although the objects 422-1 through 422-4 are shown as in a square shape or in a rectangular shape, they can also be other shapes including arrow, circle, ellipse, etc. Further, the objects 422-1 through 422-4 can also be shown in a 2-D image or a 3-D object, etc.

Figure 5:
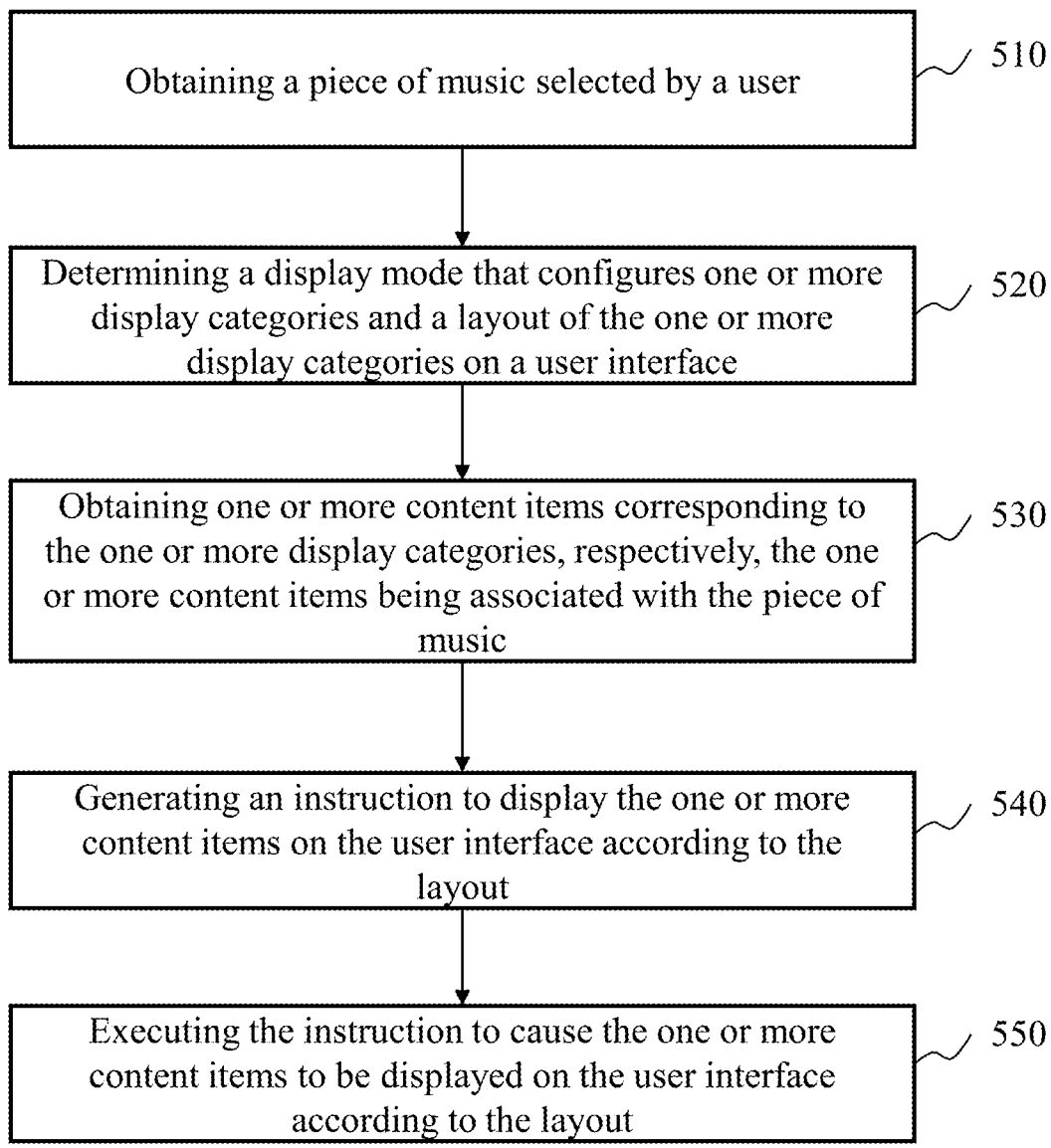
FIG. 5 is a flowchart of an exemplary process for determining an instruction to display content items on a user interface according to some embodiments of the present disclosure.

FIG. 5 is a flowchart of an exemplary process 500 for determining an instruction to display content items on a user interface according to some embodiments of the present disclosure. The process and/or method 500 may be executed by the piano system 100. For example, the process and/or method 500 may be implemented as a set of instructions (e.g., an application) stored in the ROM 230. The instruction may be sent to the display 420. The CPU 220 may execute the set of instructions and may accordingly be directed to perform the process and/or method 500.

In step 510, the processor may obtain or receive a piece of music selected by the user 150. In some embodiments, the user 150 may input the name of the selected piece of music into the piano system 100. In some embodiments, the processor may display a menu or a list for the user 150 to select a piece of music.

In step 520, the processor may obtain a display mode. The display mode may configure one or more display categories and a layout of the one or more display categories on a user interface. In some embodiments, the display mode may be inputted by the user 150. In some embodiments, the display mode may be automatically determined by the processor 220 based on the piece of music selected by the user 150, user profile, user preferences, etc.

The one or more display categories may be categories of content items, such as, a category of characters, a category of images, a category of videos, or a category of animations. In some embodiments, the one or more display categories may relate to one or more content items associated with the piece of music. The one or more content items may be at least one of characters, images, videos, or animations. The characters may be at least part of a musical notation. The images may include images related to the selected piece of music, the composer, the performer, or any other relevant figures or objects. The videos may include a video of a concert, a video showing manipulation of a piano by a pianist, a video showing the playing of a music band, etc. The animations may include a tutorial animation or any other animations.

In some embodiments, the layout may be any arrangements of one or more windows or areas displayed on the display 420 of the user interface. The display 420 may display one or more windows or areas based on the layout. The display may present one or more content items in one window. In some embodiments, the areas may be in any shape, for example, rectangular, circular, triangular, etc. In some embodiments, the areas may be in an arrangement. The arrangement may be a top-bottom arrangement, a left-right arrangement, a center-outer arrangement, or the combination thereof.

In step 530, the processor may obtain one or more content items associated with the one or more display categories in the display mode, respectively. The one or more content items may be associated with the piece of music. In some embodiments, the one or more content items may be at least one of characters, images, videos, or animations. In some embodiments, the content items may be stored in the cloud server 130 or the database 140. The processor 220 may retrieve the content items from the cloud server 130 or the database 140.

In step 540, the processor may generate an instruction to display the one or more content items on the user interface according to the layout. In some embodiments, each of the one or more content items is to be displayed in one area of the one or more areas. As in another example, one or more content items may be displayed in one area.

Additionally or alternatively, in step 550, the processor may execute the instruction to cause the one or more content items to be displayed on the user interface according to the layout. In some embodiments, the display 420 may present the one or more areas according to the instruction. In some embodiments, the one or more content items may be displayed in one area.

In some embodiments, the processor 220 may automatically determine one or more display modes in response to a user selection of a piece of music. The processor 220 may further present the one or more display modes as a menu in a pop-up window on a user interface to the user 150. When the display mode is what the user 150 desires, the user 150 may confirm the display mode. When the display mode is not what the user 150 desires, the user 150 may reject or modify the display mode.

FIG. 6 is a flowchart of an exemplary process 600 for determining a display mode for a piano system according to some embodiments of the present disclosure. The process and/or method 600 may be executed by the piano system 100. For example, the process and/or method 600 may be implemented as a set of instructions (e.g., an application) stored in the ROM 230. The CPU 220 may execute the set of instructions and may accordingly be directed to perform the process and/or method 600.

The processor may first obtain an identity of a user prior to executing the process 600. In some embodiments, the identity may include a user account registered in the piano system 100. The processor 220 may obtain the identity after the user 150 logs in the user account. In some embodiments, the processor 220 may obtain the identity using a biometric identification. The biometric identification may include a finger print identification, a palm print identification, an iris identification, etc.

In step 610, the processor may obtain a plurality of historical records associated with the user 150. In some embodiments, the plurality of historical records may include one or more historical pieces of music, one or more historical content items associated with the one or more historical pieces of music, and one or more historical display modes associated with playing the one or more historical pieces of music. The historical records may include preferred pieces of music, content items and/or display modes (preferred display categories and/or layouts). In some embodiments, the one or more historical pieces of music may include the user's favorite piece(s), playlist(s), genre(s), composer(s), collection(s), etc.

In step 620, the processor may determine a display mode based on the plurality of historical records associated with the user 150 and the piece of music selected by the user 150. The display mode may configure a layout of one or more display categories on a user interface and the one or more display categories.

In some embodiments, the processor may determine the display mode using a deep learning method. The deep learning method may employ a deep learning model to train the historical records associated with the user and discover the correlation between the display mode, the piece of music, and the user. The training using the deep learning model may yield one or more recommended display modes associated with the piece of music selected by the user. Therefore, when a user selection of a piece of music is received, the processor may retrieve at least one of the one or more recommended display modes for presentation to the user. The deep learning model may include at least one of a feed-forward neural network (FNN), a recurrent neural network (RNN), a Kohonen self-organizing map, an autoencoder, a probabilistic neural network (PNN), a time delay neural network (TDNN), a radial basis function network (RBF), a learn vector quantization, a convolutional neural network (CNN), an adaptive linear neuron (ADALINE) model, an associative neural network (ASNN). Exemplary recurrent neural network (RNN) may include a Hopfield network, a Boltzmann machine, an echo state network, a long short term memory network, a Bi-directional RNN, a hierarchical RNN, a stochastic neural network, or the like, or any combination thereof.

In some embodiments, a piece of music may include two or more phases separated by one or more transitions. Different phases may be played by different combinations of instruments and have different moods, different rhythms, different tempos, etc. Each of the two or more phases may be configured with a corresponding phasic display mode and/or one or more phasic content items. The processor may generate a phasic instruction for each phase of the piece of music.

Figure 7:
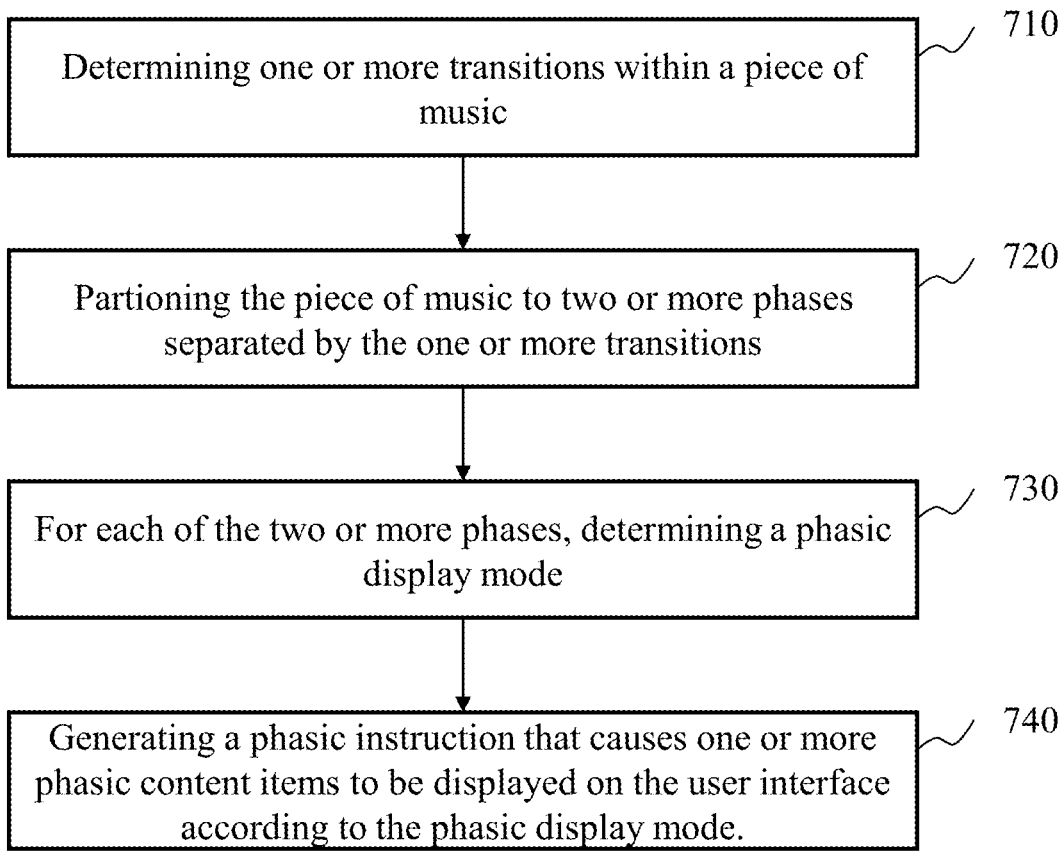
FIG. 7 is a flowchart of an exemplary process for generating a phasic instruction for one of two or more phases of a piece of music according to some embodiments of the present disclosure.

FIG. 7 is a flowchart of an exemplary process 700 for generating a phasic instruction for one of two or more phases of a piece of music according to some embodiments of the present disclosure. The process and/or method 700 may be executed by the piano system 100. For example, the process and/or method 700 may be implemented as a set of instructions (e.g., an application) stored in the ROM 230. The CPU 220 may execute the set of instructions and may accordingly be directed to perform the process and/or method 700.

In step 710, the processor may determine one or more transitions within a piece of music. Information related to the one or more transitions may be stored in the database 140, the ROM 230, the disk 270, or any other internal or external storage. The transitions may take the form of breaks.

In step 720, the processor may partition the piece of music to two or more phases. The two or more phases may be separated by the one or more transitions. In some embodiments, the phases may take the form of movements, periods, sections, etc. In some embodiments, different phases may be played by different combinations of instruments and have different moods, different rhythms, different tempos, etc.

In step 730, for each of the two or more phases, the processor may determine a phasic display mode. The phasic display mode may define one or more phasic display categories and a phasic layout. The phasic display mode may be a display mode applicable during one phase. Different phases may have different phasic display modes. The phasic content items may be content items that are displayed during one phase. Different phases may have different phasic content items. For example, a first phase of a piece of music may correspond to an introductory animation introducing a composer or a performer of the music; while the second phase of the piece of music may correspond to a live record of a performance of the piece of music. Different phases may have different phasic layouts. For example, during the first phase of a piece of music, the first phasic layout may instruct a display to present two areas, in a left-right manner. During the second phase of the piece of music, the second phasic layout may instruct the display to present another two areas, in a top-bottom manner. In some embodiments, the processor may determine the phasic display mode according to the process 600.

In step 740, the processor may generate a phasic instruction that causes one or more phasic content items to be displayed on the user interface according to the phasic display mode.

FIG. 8 is a flowchart of an exemplary process 800 for determining one or more phasic content items for a piece of music according to some embodiments of the present disclosure. The piece of music may have two or more phases. The process and/or method 800 may be executed by the piano system 100. For example, the process and/or method 800 may be implemented as a set of instructions (e.g., an application) stored in the ROM 230. The CPU 220 may execute the set of instructions and may accordingly be directed to perform the process and/or method 800.

In step 810, for each of the two or more phases, the processor may configure one or more phasic display categories and a phasic layout of the one or more phasic display categories on the user interface for the phasic display mode In step 820, the processor may obtain the one or more phasic content items corresponding to the one or more phasic display categories, respectively. The one or more phasic content items may be associated with a corresponding phasic piece of music. For example, if the phasic display category is the category of "introductory animation" and the corresponding phasic piece of music is the first movement (allegro) of the violin concerto in E major (Bach-Werke-Verzeichnis 1042) by Johann Sebastian Bach, the processor may obtain a short animation introducing Bach and the background of the music.

FIGS. 9A-9H are diagrams illustrating different display modes of a piano system according to some embodiments of the present disclosure.

Figure 9A:
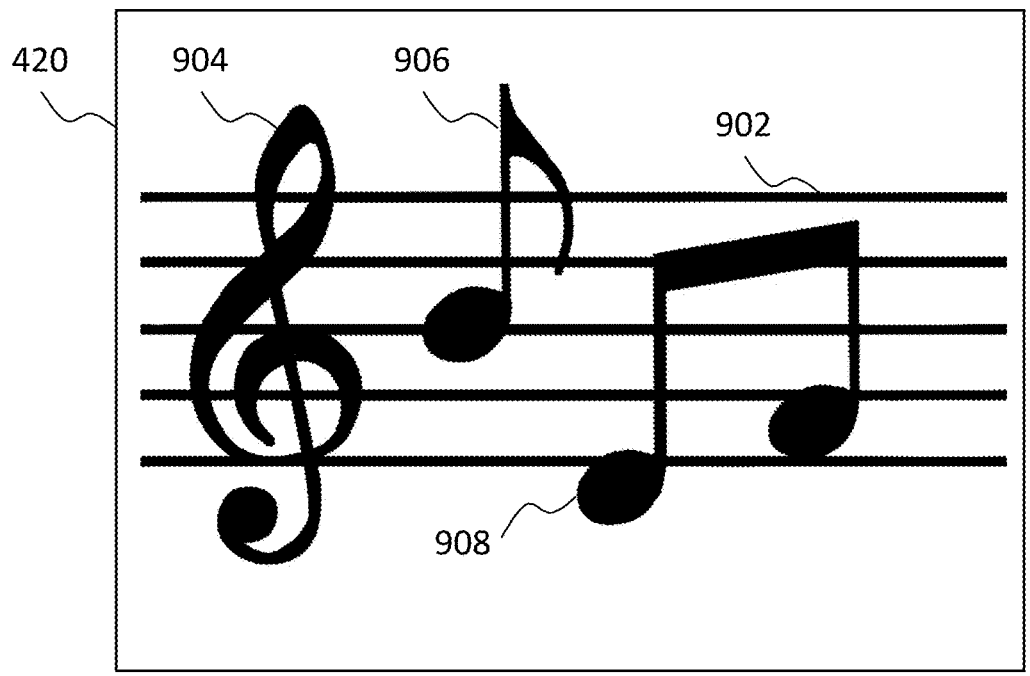
FIGS. 9A-9H are diagrams illustrating different display modes of a piano system according to some embodiments of the present disclosure.

As shown in FIG. 9A, the display mode may be configured with one display category and display music notations of a piece of music on the entire display 420. The music notations may include a staff 902, a plurality of clefs 904, 906 and 908. The staff 902 and the plurality of clefs 904, 906 and 908 may provide a reference to the user 150 while practicing the digital instrument 110. In some embodiments, the music notations may be dynamically updated according to the process of playing the piece of music.

Figure 9B:
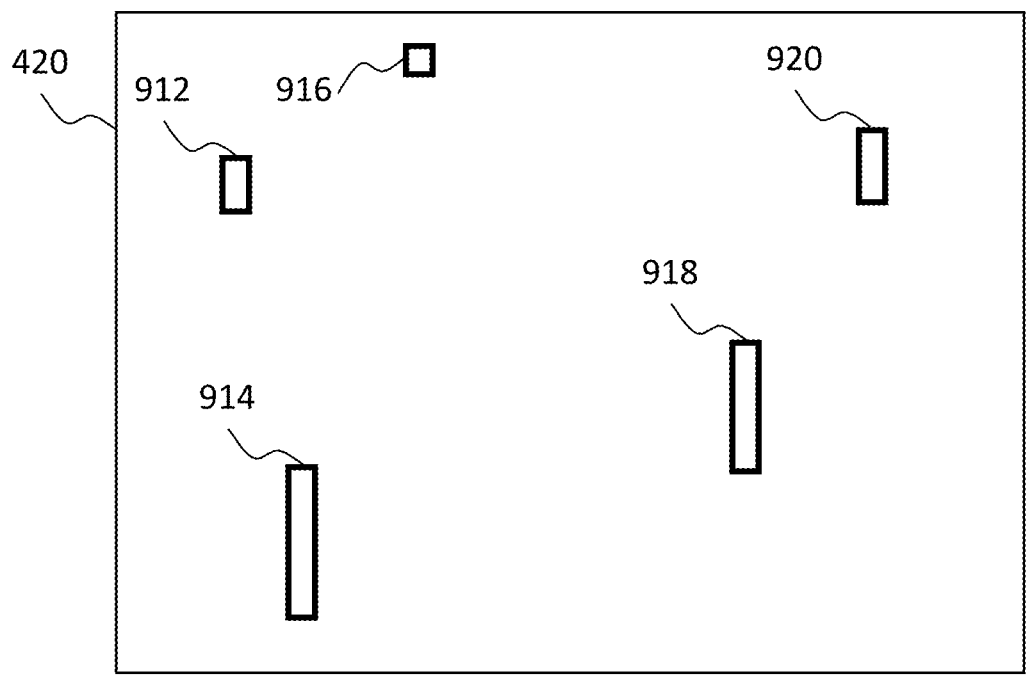

As shown in FIG. 9B, the display mode may be configured with one display category and display one or more objects 912, 914, 916, 918 and 920 on the entire display 420. The one or more objects 912, 914, 916, 918 and are similar to the objects 422-1 through 422-4 in FIG. 4, and therefore, are not described in detail herein. In some embodiments, the movements of one or more objects 912, 914, 916, 918 on the display 420 may be dynamically updated according to the process of playing the piece of music.

Figure 9C:
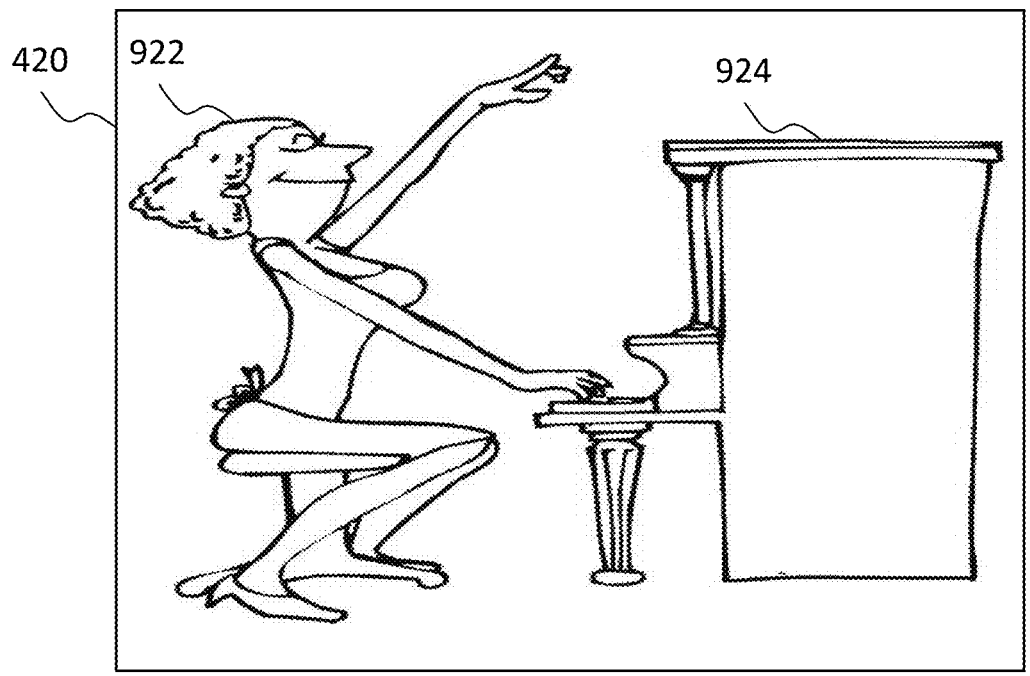

As shown in FIG. 9C, the display mode may be configured with one display category and display a performance video on the entire display 420. The performance video may be played in response to the user 150's switching of the working mode of the digital instrument 110 to the presenting mode. The performance video may show at least one performer 922 who plays a piano 924. The performance video shown in FIG. 9C is for illustrative purpose. The present disclosure is not intended to be limiting. For example, the at least one performer 922 may play any instruments other than the piano.

Figure 9D:
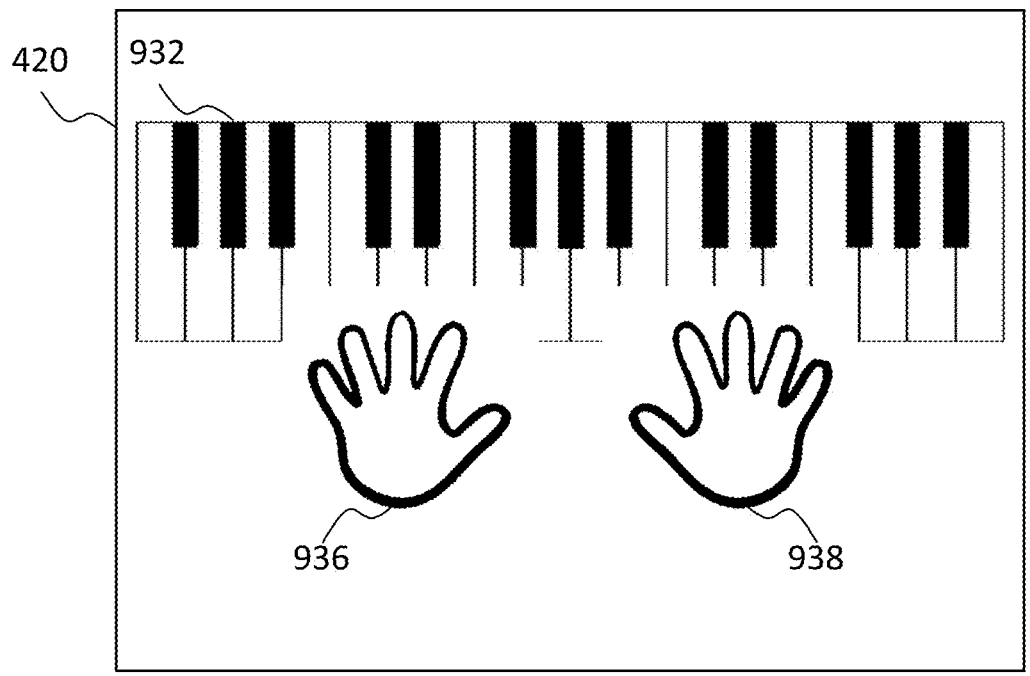

As shown in FIG. 9D, the display mode may be configured with one display category and display a video of a performer who is playing a keyboard 932 using both hands 934 and 936 on the entire display 420. The video may dynamically show how the hands 934 and 936 press keys on the keyboard 932. The video may instruct the user 150 to practice the digital instrument 110. The video may be played in response to the user 150's switching of the working mode of the digital instrument 110 to one of the normal mode, the presenting mode, or the tutorial mode.

Figure 9E:
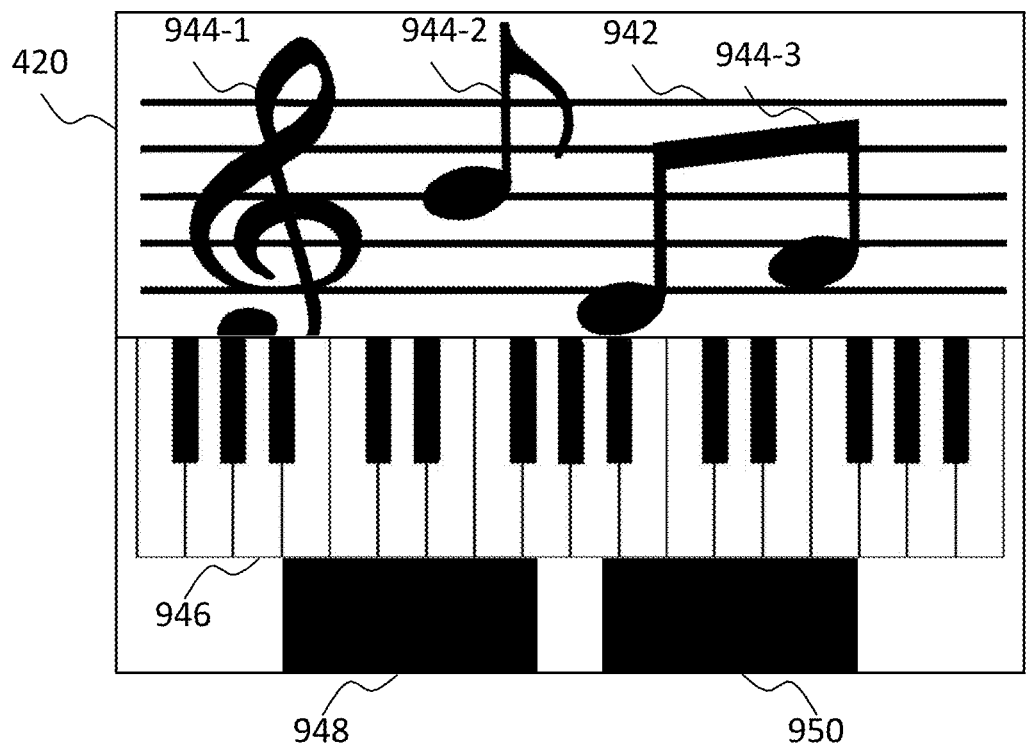

As shown in FIG. 9E, the display mode may be configured with two display categories and display music notations on the top half of the display 420 and a video of a performer who is playing a keyboard 946 using both hands 948 and 950 on the bottom half of the display 420. The display mode shown in FIG. 9E may provide more information simultaneously to instruct the user 150 to play the digital instrument 110.

Figure 9F:
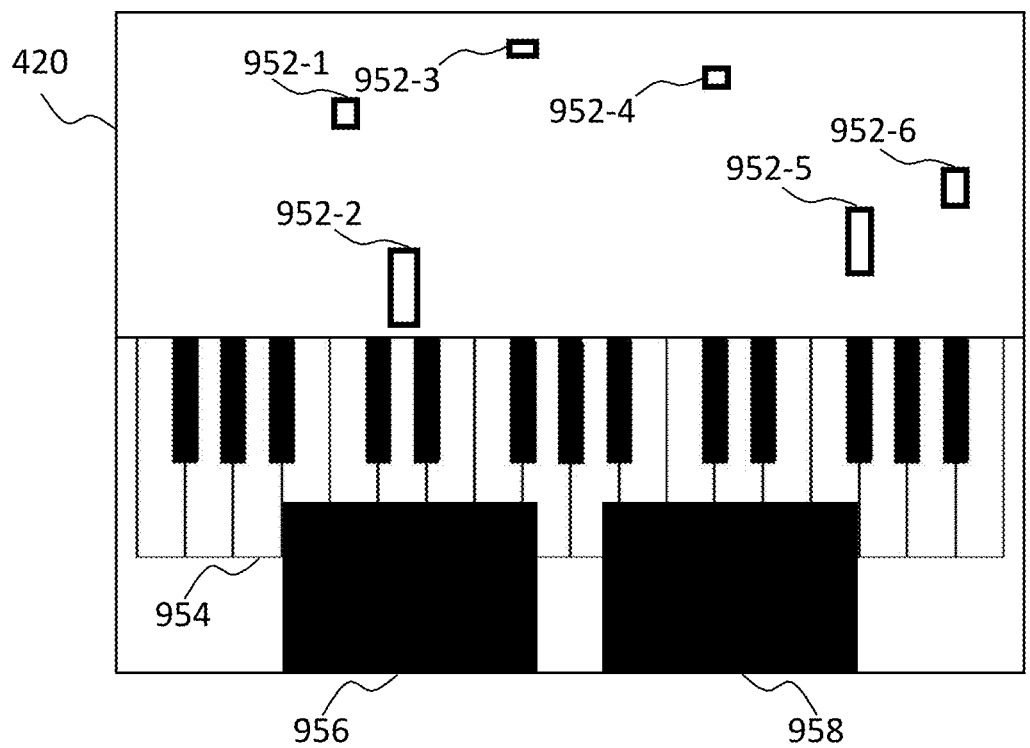

As shown in FIG. 9F, the display mode may be configured with two display categories and display one or more objects 952-1 through 952-6 on the top half of the display 420 and a video of a performer who is playing a keyboard 954 using both hands 956 and 958 on the bottom half of the display 420. The objects 952-1 through 952-6 may be similar to the objects 422-1 through 422-4 in FIG. 4, and thus, are not described in detail herein. The video may be played in response to the user 150's switching of the working mode of the digital instrument 110 to the normal mode, the presenting mode, or tutorial mode.

Figure 9G:
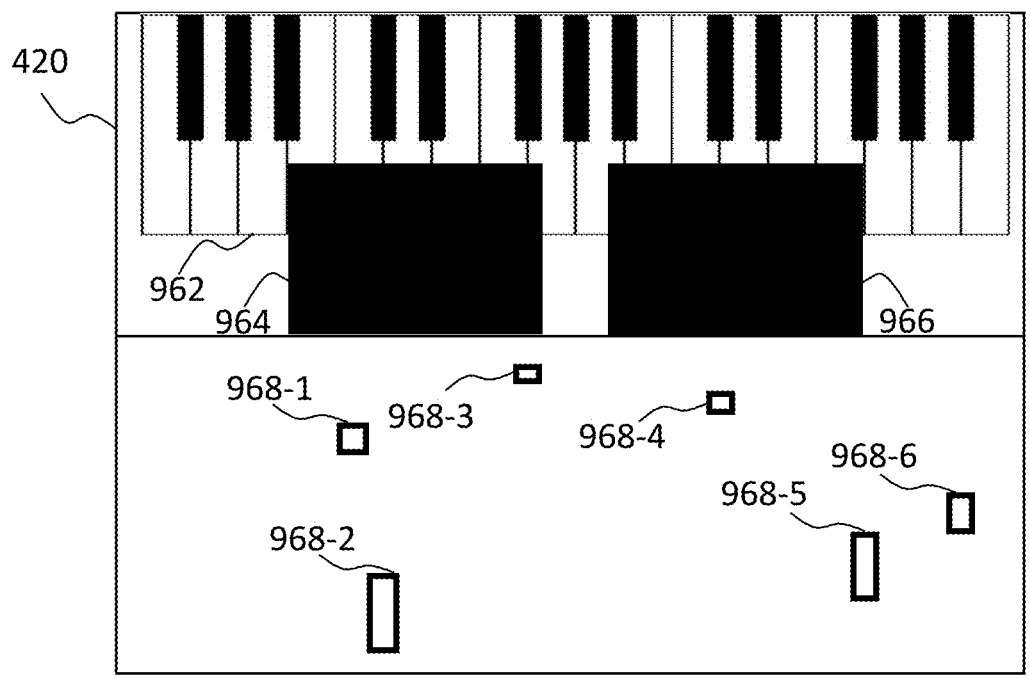

Alternatively, as shown in FIG. 9G, the display mode may be configured with two display categories and display a video of a performer who is playing a keyboard 962 using both hands 964 and 966 on the top half of the display 420 and one or more objects 968-1 through 968-6 on the bottom half of the display 420.

Figure 9H:
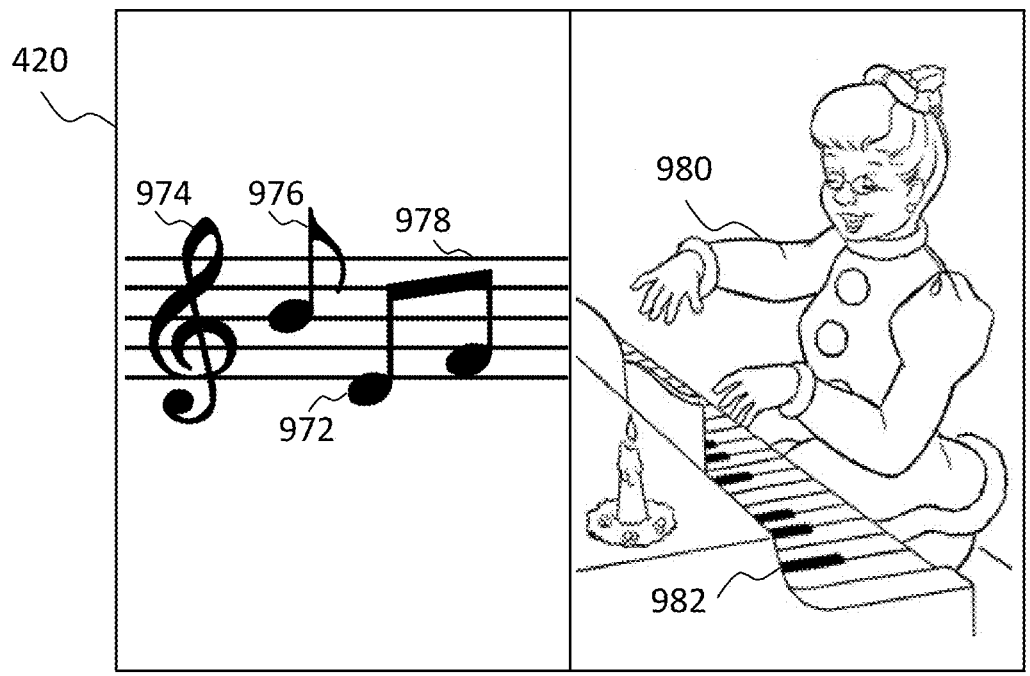

As shown in FIG. 9H, the display mode may be configured with two display categories and display music notations on the left half of the display 420 and a video of a performance on the right half of the display 420. Similar to FIG. 9A, the music notations may be dynamically updated according to the process of playing the piece of music.

It should be understood that the examples shown in FIGS. 9A-9H are for illustrative purpose. The present disclosure is not intended to be limiting. For example, it is not necessary to equally divide the area of the display 420 into two areas to display two content items. The display mode may configure different sizes of the areas to accommodate the display needs of the content items. For example, the video may occupy a larger area than the music notations in the display 420. Further, the display mode may include more than two display areas (i.e, corresponding to more than two display categories) to illustrate more than two content items and the layout of the more than two content items can vary.

The above description may serve for an illustrative purpose, it is not intended that it should be limited to any particulars or embodiments. The scope of the disclosure herein is not to be determined from the detailed description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

The various methods and techniques described above provide a number of ways to carry out the application. Of course, it is to be understood that not necessarily all objectives or advantages described may be achieved in accordance with any particular embodiment described herein. Thus, for example, those skilled in the art will recognize that the methods may be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

The recitation of ranges of values herein is merely intended to serve as a shorthand method of referring individually to each separate value falling within the range. Unless otherwise indicated herein, each individual value is incorporated into the specification as if it were individually recited herein. All methods described herein may be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein. Variations on those preferred embodiments will become apparent to those of ordinary skill in the art upon reading the foregoing description. It is contemplated that skilled artisans may employ such variations as appropriate, and the application may be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A method implemented on a digital instrument having at least one processor and at least one computer-readable storage medium, comprising:
   obtaining a piece of music selected by a user;
   obtaining a plurality of historical records associated with the user including one or more historical Pieces of music selected by the user, one or more historical content items associated with the one or more historical pieces of music, and one or more historical display modes associated with playing the one or more historical pieces of music;
   determining a display mode that configures one or more display categories and a layout of the one or more display categories on a user interface based on the plurality of historical records associated with the user and the piece of music selected by the user;
   obtaining one or more content items corresponding to the one or more display categories, respectively, the one or more content items being associated with the piece of music; and
   generating an instruction to display the one or more content items on the user interface according to the layout.

2. The method of claim 1, wherein the one or more display categories include at least one of characters, images, videos, or animations.

3. The method of claim 1, wherein determining the display mode further comprises training the plurality of historical records using a deep learning model.

4. The method of claim 1, further comprising:
   determining one or more transitions within the piece of music;
   partitioning the piece of music to two or more phases separated by the one or more transitions;
   for each of the two or more phases,
      determining a phasic display mode; and
      generating a phasic instruction that causes one or more phasic content items to be displayed on the user interface according to the phasic display mode.

5. The method of claim 4, further comprising:
for each of the two or more phases,
configuring one or more phasic display categories and a phasic layout of the one or more phasic display categories on the user interface for the phasic display mode; and
obtaining the one or more phasic content items corresponding to the one or more phasic display categories, respectively, the one or more phasic content items being associated with a corresponding phasic piece of music.

6. A piano system, comprising:
a keyboard hosting a plurality of keys operable to a user;
a display adjacent to the keyboard;
at least one computer-readable storage medium including a set of instructions for presenting contents to the user; and
at least one processor in communication with the at least one computer-readable storage medium, wherein when executing the instructions, the at least one processor is directed to:
obtain a piece of music selected by the user;
obtain a plurality of historical records associated with the user including one or more historical pieces of music selected by the user, one or more historical content items associated with the one or more historical pieces of music, and one or more historical display modes associated with playing the one or more historical pieces of music;
determine a display mode that configures one or more display categories and a layout of the one or more display categories on a user interface based on the plurality of historical records associated with the user and the piece of music selected by the user;
obtain one or more content items corresponding to the one or more display categories, respectively, the one or more content items being associated with the piece of music; and
generate an instruction to display the one or more content items on the user interface according to the layout.

7. The piano system of claim 6, wherein the one or more displayed categories include at least one of characters, images, videos, or animations.

8. The system of claim 6, wherein to determine the display mode, the at least one processor is further configured to train the plurality of historical records using a deep learning model.

9. The piano system of claim 6, wherein the display has a high definition format.

10. The piano system of claim 6, further comprising a switch configured to switch the piano system between at least two working modes.

11. The piano system of claim 10, wherein the at least two working modes include a tutorial mode in which the display is configured to present one or more tutorials that instruct the user to practice the plurality of keys.

12. The piano system of claim 11, further comprising at least one sensor, wherein the at least one sensor is configured to record information related to interactions between the user and the plurality of keys, the at least one sensor including at least one of an image sensor, an audio sensor, a pressure sensor, a speed sensor, an accelerometer, or a mechanical sensor.

13. The piano system of claim 12, wherein the at least one processor is further configured to determine a feedback to the user based on the recorded information.

14. The piano system of claim 10, wherein the at least two working modes include a presenting mode in which the display is configured to present the one or more content items to the user.

15. The piano system of claim 6, wherein the at least one processor is further configured to:
determine one or more transitions within the selected piece of music;
partition the piece of music to two or more phases separated by the one or more transitions;
for each of the two or more phases,
determine a phasic display mode; and
generate a phasic instruction that causes one or more phasic content items displaying on the user interface according to the phasic display mode.

16. The system of claim 15, wherein the at least one processor is further configured to:
for each of the two or more phases,
configure one or more phasic display categories and a phasic layout of the one or more phasic display categories on the user interface for the phasic display mode; and
obtain the one or more phasic content items corresponding to the one or more phasic display categories, respectively, the one or more phasic content items being associated with a corresponding phasic piece of music.

17. The system of claim 15, wherein the at least one processor is further configured to execute the instruction to cause the one or more content items displaying on the user interface according to the layout.

18. A non-transitory computer readable medium embodying a computer program product, the computer program product comprising instructions configured to cause a computing system to:
obtain a piece of music selected by a user;
obtain a plurality of historical records associated with the user including one or more historical pieces of music selected by the user, one or more historical content items associated with the one or more historical pieces of music, and one or more historical display modes associated with playing the one or more historical pieces of music;
determine a display mode that configures one or more display categories and a layout of the one or more display categories on a user interface based on the plurality of historical records associated with the user and the piece of music selected by the user;
obtain one or more content items corresponding to the one or more display categories, respectively, the one or more content items being associated with the piece of music; and
generate an instruction to display the one or more content items on the user interface according to the layout.

19. The non-transitory computer readable medium of claim 18, the computer program product further comprising instructions configured to cause a computing system to:
determine one or more transitions within the piece of music;
partition the piece of music to two or more phases separated by the one or more transitions;
for each of the two or more phases,
determine a phasic display mode; and
generate a phasic instruction that causes one or more phasic content items to be displayed on the user interface according to the phasic display mode.

20. The non-transitory computer readable medium of claim 19, the computer program product further comprising instructions configured to cause a computing system to:
for each of the two or more phases,
configure one or more phasic display categories and a phasic layout of the one or more phasic display categories on the user interface for the phasic display mode; and
obtain the one or more phasic content items corresponding to the one or more phasic display categories, respectively, the one or more phasic content items being associated with a corresponding phasic piece of music.

* * * * *